(12) United States Patent
Huettner et al.

(10) Patent No.: US 11,073,121 B2
(45) Date of Patent: Jul. 27, 2021

(54) TWO STEP METERING SOLENOID FOR FLUID DISPENSER

(71) Applicant: ENGINETICS, LLC, Fernandina, FL (US)

(72) Inventors: Thomas Huettner, Dexter, MI (US); Joseph Lull, South Haven, MI (US); Justin Warner, Milford, MI (US)

(73) Assignee: Enginetics, LLC, Miami Beach, FL (US)

( * ) Notice: Subject to any disclaimer, the term of this patent is extended or adjusted under 35 U.S.C. 154(b) by 0 days.

(21) Appl. No.: 16/907,019

(22) Filed: Jun. 19, 2020

(65) Prior Publication Data

US 2020/0318595 A1 Oct. 8, 2020

Related U.S. Application Data

(63) Continuation of application No. 15/960,813, filed on Apr. 24, 2018, now Pat. No. 10,697,415, which is a
(Continued)

(51) Int. Cl.
*F02M 63/00* (2006.01)
*F02M 43/04* (2006.01)
(Continued)

(52) U.S. Cl.
CPC .... *F02M 63/0015* (2013.01); *F02M 21/0248* (2013.01); *F02M 21/04* (2013.01); *F02M 43/04* (2013.01); *F02M 51/061* (2013.01); *F02M 51/0617* (2013.01); *F02M 51/0682* (2013.01); *F02M 61/18* (2013.01); *F02M 67/02* (2013.01); *F02M 67/12* (2013.01); *F02M 69/047* (2013.01); *F02B 43/00* (2013.01); *F02D 19/02* (2013.01); *F02M 21/02* (2013.01); *F02M 2200/46* (2013.01); *Y02T 10/30* (2013.01)

(58) Field of Classification Search
CPC .......... F02M 63/0015; F02M 21/0248; F02M 21/04; F02M 43/04; F02M 51/061; F02M 51/0617; F02M 61/18; F02M 67/02; F02M 67/12; F02M 69/047; F02M 21/02; F02M 2200/46; F02B 43/00; F02D 19/02; Y02T 10/30
USPC .......................................................... 239/5
See application file for complete search history.

(56) References Cited

U.S. PATENT DOCUMENTS 2,132,204 A 10/1938 Davis et al.
3,913,807 A 10/1975 Lale et al.
(Continued)

OTHER PUBLICATIONS

PCT International Search Report for International Application No. PCT/US2013/058698, dated Feb. 24, 2014 (2 pp.).

*Primary Examiner* — Joseph J Dallo
*Assistant Examiner* — Yi-Kai Wang
(74) *Attorney, Agent, or Firm* — Blank Rome LLP

(57) ABSTRACT

A metering system for a fluid atomizer includes a housing, first and second metering members, and at least one solenoid. The housing includes a mixing chamber. The first metering member is operable to control flow of a first fluid to the mixing chamber. The second metering member is arranged coaxial with the first metering member and operable to control flow of a second fluid to the mixing chamber. The at least one solenoid is configured to operate at least one of the first and second metering members.

22 Claims, 16 Drawing Sheets

Related U.S. Application Data continuation of application No. 15/044,792, filed on Feb. 16, 2016, now Pat. No. 9,982,643, which is a continuation of application No. 13/626,693, filed on Sep. 25, 2012, now Pat. No. 9,261,049.

(51) Int. Cl.
*F02M 69/04* (2006.01)
*F02M 21/02* (2006.01)
*F02M 51/06* (2006.01)
*F02M 67/02* (2006.01)
*F02M 67/12* (2006.01)
*F02M 21/04* (2006.01)
*F02M 61/18* (2006.01)
*F02D 19/02* (2006.01)
*F02B 43/00* (2006.01)

(56) References Cited

U.S. PATENT DOCUMENTS

| | | |
|---|---|---|
| 4,007,880 A | 2/1977 | Hans et al. |
| 4,033,314 A | 7/1977 | Walton |
| 4,339,082 A | 7/1982 | Radaelli et al. |
| 4,342,443 A | 8/1982 | Wakeman |
| 4,483,508 A | 11/1984 | Marsh et al. |
| 4,771,749 A | 9/1988 | Kiuchi et al. |
| 5,046,472 A * | 9/1991 | Linder ............... F02M 51/061 123/533 |
| 5,224,450 A | 7/1993 | Paul et al. |
| 5,464,156 A | 11/1995 | Ricco et al. |
| 5,526,796 A | 6/1996 | Thring et al. |
| 5,720,261 A | 2/1998 | Sturman et al. |
| 5,782,267 A | 7/1998 | Yoo |
| 6,027,050 A | 2/2000 | Rembold et al. |
| 6,073,862 A * | 6/2000 | Touchette ............ F02M 43/04 239/408 |
| 6,085,991 A | 7/2000 | Sturman |
| 6,427,660 B1 | 8/2002 | Yang |
| 6,796,511 B2 | 9/2004 | Hohl |
| 7,422,166 B2 | 9/2008 | Hoffmann et al. |
| 7,828,233 B2 | 11/2010 | Luft |
| 8,128,378 B2 | 3/2012 | Rowan et al. |
| 2005/0092306 A1 | 5/2005 | Shinogle et al. |
| 2007/0246561 A1 | 10/2007 | Gibson |
| 2011/0209784 A1 | 9/2011 | Stein |
| 2011/0284652 A1 * | 11/2011 | Amaya ................ F23D 11/40 239/8 |

* cited by examiner

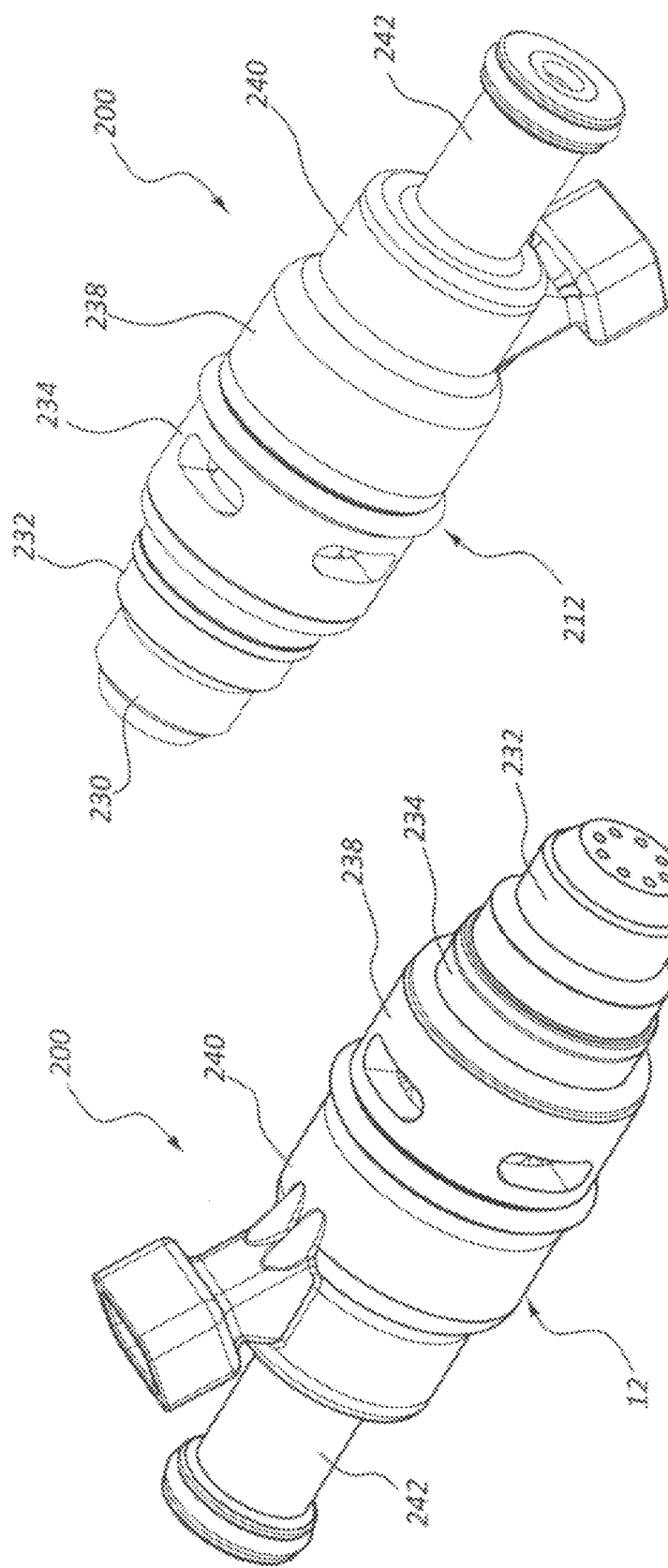

TWO STEP METERING SOLENOID FOR FLUID DISPENSER

CROSS-REFERENCE TO RELATED APPLICATIONS

This application is a continuation of U.S. patent application Ser. No. 15/960,813, filed Apr. 24, 2018, and entitled TWO STEP METERING SOLENOID FOR FLUID DISPENSER, pending, which is a continuation of U.S. patent application Ser. No. 15/044,792, filed Feb. 16, 2016, and entitled TWO STEP METERING SOLENOID FOR MULTI-PHYSICS FUEL ATOMIZER, now U.S. Pat. No. 9,982,643, issued May 29, 2018, which is a continuation of U.S. patent application Ser. No. 13/626,693, filed Sep. 25, 2012, and entitled TWO STEP METERING SOLENOID FOR MULTI-PHYSICS FUEL ATOMIZER, now U.S. Pat. No. 9,261,049, issued Feb. 16, 2016, the disclosures of which are incorporated herein in their entireties by this reference.

TECHNICAL FIELD

The present disclosure is directed to fuel systems, and more particularly directed to metering of fuel delivery systems that use multiple stages to enhance evaporation of the fuel.

BACKGROUND

Many types of devices have been developed over the years for the purpose of converting liquids into aerosols or fine particles readily converted into a gas-phase. Many such devices have been developed, for example, to prepare fuel for use in internal combustion engines. To optimize fuel oxidation within an engine's combustion chamber, the fuel must be vaporized, homogenized with air, and in a chemically-stoichiometric gas-phase mixture. Ideal fuel vaporization enables more complete combustion and consequent increases in efficiency as well as enhanced emissions control and lower engine out pollution.

More specifically, relative to internal combustion engines, stoichiometricity is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to ignition for proper oxidation. Non-vaporized fuel droplets do not ignite or combust completely in conventional internal and external combustion engines, which degrades fuel efficiency and increases engine out pollution.

Attempts to reduce or control emission byproducts by adjusting temperature and pressure typically affects the $NO_x$ byproduct. To meet emission standards, these residues must be dealt with, typically requiring after treatment in a catalytic converter or a scrubber. Such treatment of these residues results in additional fuel costs to operate the catalytic converter or scrubber and may require additional component costs as well as packaging and mass implications. Accordingly, any reduction in engine out residuals resulting from incomplete combustion would be economically and environmentally beneficial.

Aside from the problems discussed above, and other concerns such as in-cylinder wetting and consequent oil dilution of power cylinder component and excessive wetting oil dilution in the sump, a fuel that is not completely vaporized in a chemically stoichiometric air/fuel mixture causes the combustion engine to perform at less than peak efficiency. A smaller portion of the fuel's chemical energy is converted to mechanical energy when fuel is not completely combusted. Fuel energy is wasted and unnecessary pollution is created. Thus, by further breaking down and more completely vaporizing the fuel-air mixture, better fuel efficiency may be available.

Many attempts have been made to alleviate the above-described problems with respect to fuel vaporization and incomplete fuel combustion. In automobile engines, for example, inlet port or direct fuel injection has almost universally replaced carburetion for fuel delivery. Fuel injectors spray fuel directly into the inlet port or cylinder of the engine and are controlled electronically. Injectors facilitate more precise metering and control of the amount of fuel delivered to each cylinder independently relative to carburetion. This reduces or eliminates charge transport time facilitating optimal transient operation. Nevertheless, the fuel droplet size of a fuel injector spray is not optimal and there is little time for the fuel to mix with air prior to ignition.

SUMMARY

The principles described herein may address some of the above-described deficiencies and others. Specifically, some of the principles described herein relate to liquid processor apparatuses and methods.

One aspect provides a metering system for a fuel atomizer that includes a housing, first and second metering members, and at least one solenoid. The housing includes a mixing chamber. The first metering member is operable to control flow of oxidizer to the mixing chamber. The second metering member is arranged coaxial with the first metering member and operable to control flow of fuel to the mixing chamber. The at least one solenoid is configured to operate at least one of the first and second metering members.

The at least one solenoid may operate the first metering member, and operating the first metering member may operate the second metering member. The first metering member may move from a closed position to an open position before the second metering member moves from a closed position to an open position. The second metering member may move from the open position to the closed position before the first metering member moves from the open position to the closed position.

The metering system may include a biasing member interposed between the first and second metering members, wherein moving the first metering member from a closed position to an open position releases the biasing member to permit the second metering member to move from a closed position to an open position. At least one solenoid may include a first solenoid that operates the first metering member, and a second solenoid that operates the second metering member. The second metering member may extend through the first metering member. A spring constant of the biasing member may determine an amount of time that the first metering member is open before the second metering member opens and an amount of time the first metering member is open after the second metering member closes. The first metering member may interface with an oxidizer seat to control flow of oxidizer, and the second metering member may interface with a fuel seat to control flow of fuel, wherein the oxidizer seat is positioned radially outward from the fuel seat.

Another aspect of the present disclosure relates to a method of controlling flow in a fuel atomizer. The method includes providing a housing and first and second metering members, wherein the housing includes a mixing chamber, and the second metering member is positioned coaxially with the first metering member. The method includes opening the first metering member to permit oxidizer flow into the mixing chamber, opening the second metering member after opening the first metering member to permit fuel flow into the mixing chamber, closing the second metering member to stop fuel flow into the mixing chamber, and closing the first metering member after the second metering member is closed to stop oxidizer flow into the mixing chamber.

Closing the second metering member may include applying an axial force to the second metering member upon moving the first metering member toward a closed position. The method may include providing at least one solenoid, and operating the at least one solenoid opens and closes the first and second metering members in sequence. The method may include first and second solenoids, wherein operating the first solenoid opens and closes the first metering member, and operating the second solenoid opens and closes the second metering member. The method may include at least one biasing member, wherein activating the at least one solenoid opens at least one of the first and second metering members against biasing forces of the biasing member, and deactivating the solenoid permits the biasing forces of the biasing member to close at least one of the first and second metering members.

Another aspect of the present disclosure relates to a dual fluid delivery device that includes first and second metering devices. The first metering device is operable to control flow of a first fluid. The second metering device is operable to control flow of a second fluid, the second metering device being arranged coaxially with the first metering device. Operating the first metering device between open and closed positions automatically moves the second metering device between open and closed position in a sequence of the first metering device opening, the second metering device opening, the second metering device closing, and the first metering device closing.

The dual fluid delivery device may include at least one solenoid configured to move the first metering device between closed and open positions. The dual fluid delivery device may include at least one biasing member coupled between the first and second metering members, and moving the first metering member changes a biasing force applied by the at least one biasing member to the second metering member. The first fluid may include an oxidant and the second fluid may include a fuel. The dual fluid delivery device may include a mixing chamber, wherein the first metering member delivers the first fluid to the mixing chamber to mix with the second fluid delivered by the second metering member. At least a portion of the second metering member may extend through at least a portion of the first metering member.

BRIEF DESCRIPTION OF THE DRAWINGS

The accompanying drawings illustrate certain embodiments discussed below and are a part of the specification.

FIG. 7 is a perspective view of another example fuel delivery device in accordance with the present disclosure.

FIG. 8 is another perspective view of the fuel delivery device of FIG. 7.

Throughout the drawings, identical reference characters and descriptions indicate similar, but not necessarily identical elements.

DETAILED DESCRIPTION

Figure 1:
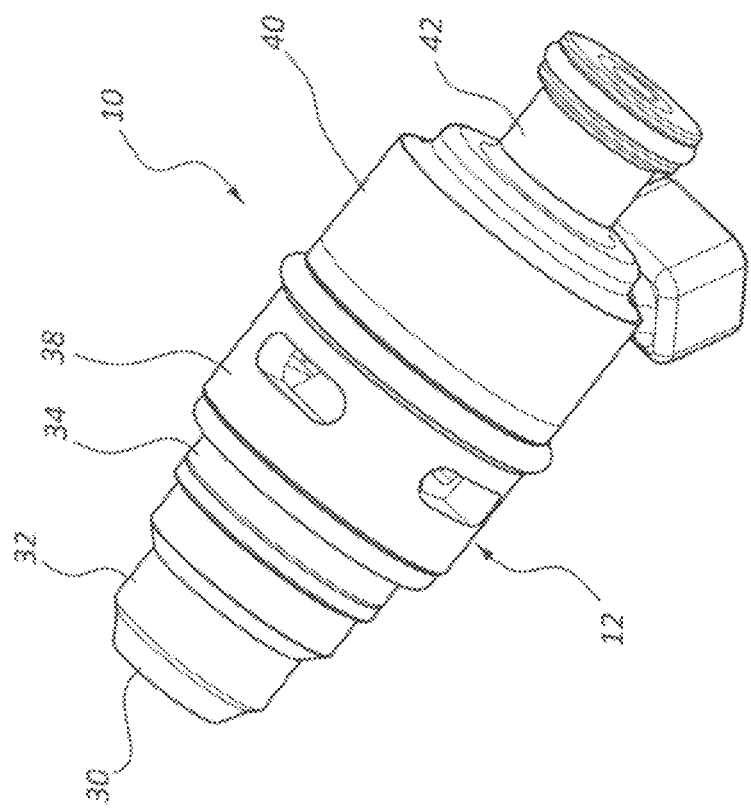
FIG. 1 is a perspective view of an example fuel delivery device in accordance with the present disclosure.
Figure 2:
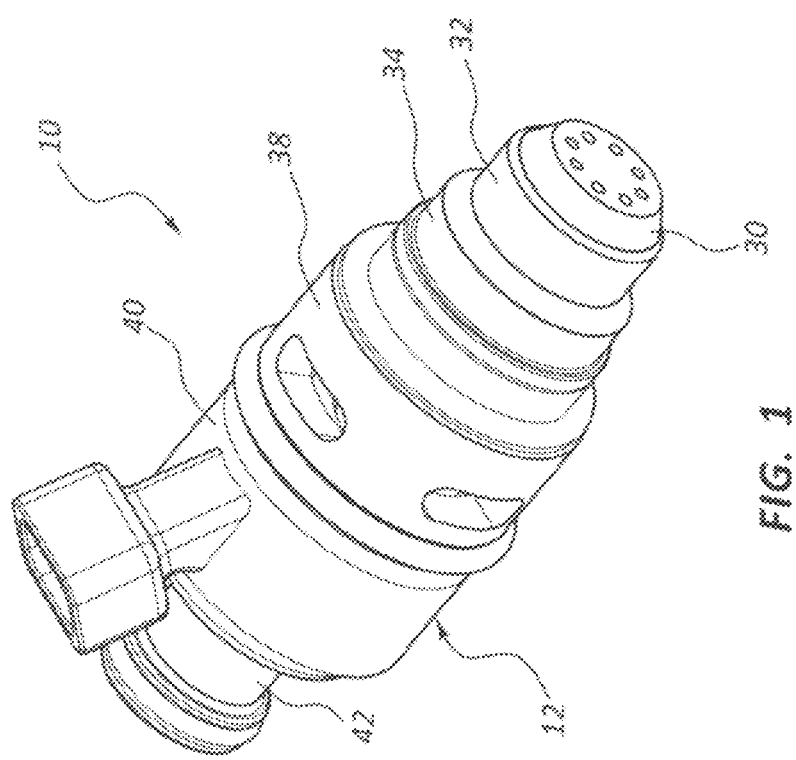
FIG. 2 is another perspective view of the fuel delivery device of FIG. 1.
Figure 3:
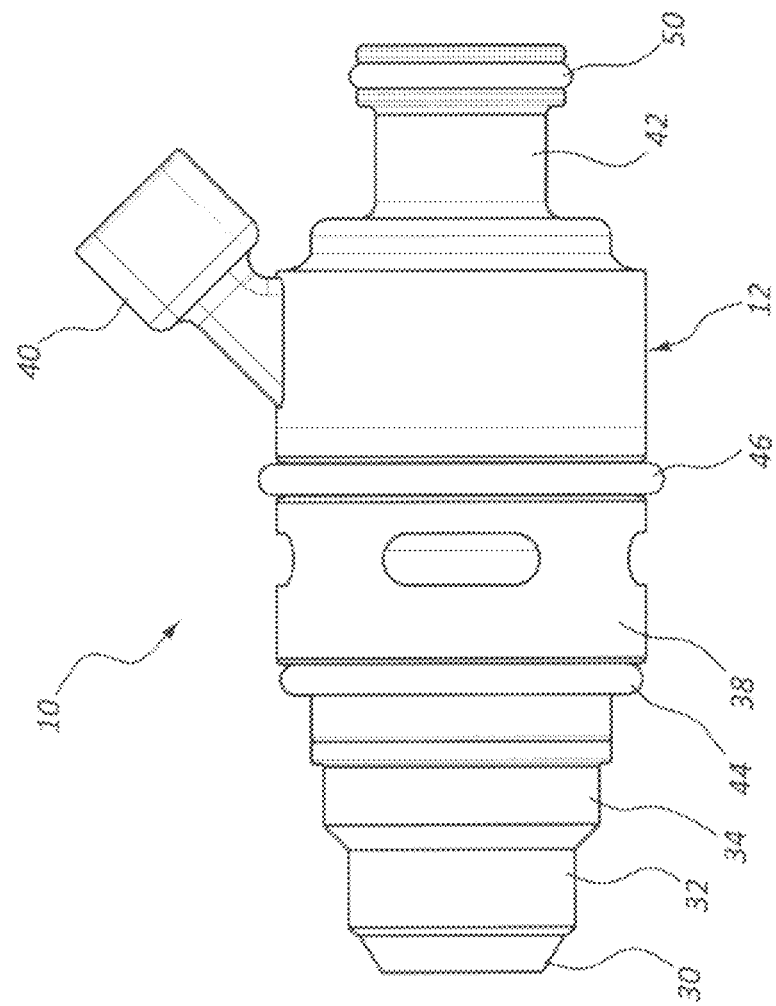
FIG. 3 is a side view of the fuel delivery device of FIG. 1.
Figure 4:
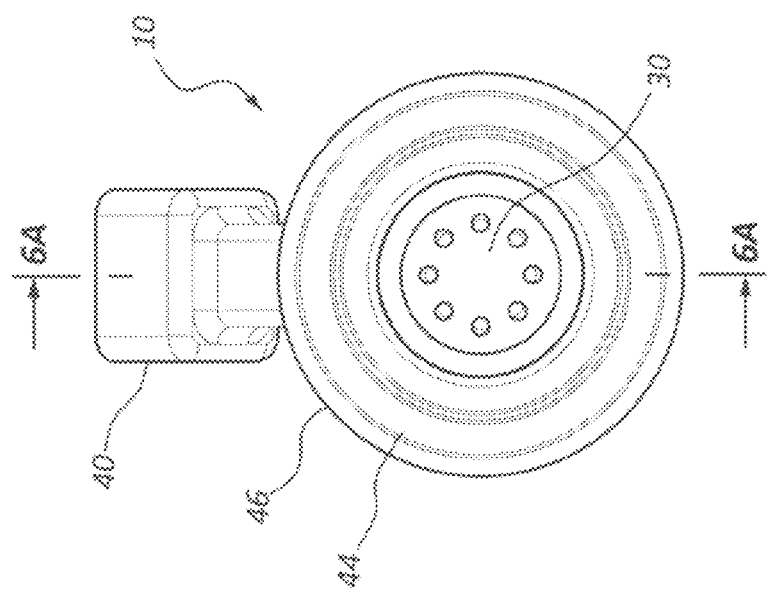
FIG. 4 is a front view of the fuel delivery device of FIG. 1.
Figure 5:
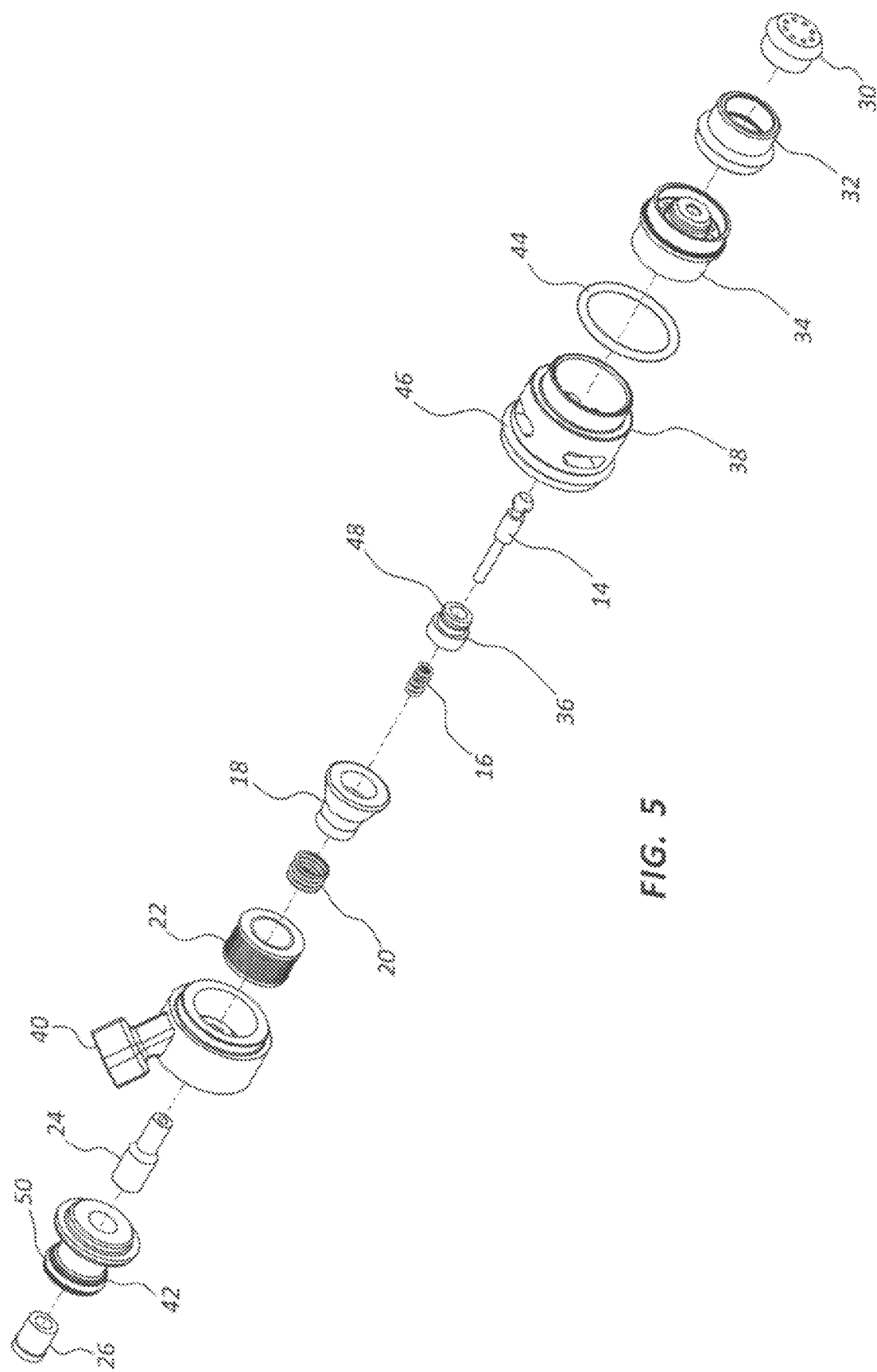
FIG. 5 is an exploded perspective view of the fuel delivery device of FIG. 1.

Illustrative embodiments and aspects are described below. It will, of course, be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present disclosure is generally directed to a dual fluids delivery device (e.g., an injector). The fluids handled by the dual fluids delivery device may include fuel, oxidant, or a combination thereof. The dual fluids injector includes a plurality of metering members, wherein each metering member controls flow of one fluid through the delivery device. The metering members may be arranged coaxially. The coaxial arrangement of the metering member may help reduce overall package size of the injector. The coaxial arrangement may also promote simplified mechanical designs wherein, for example, moving one metering member provides movement of a second metering member concurrently or in sequence.

An integrated dual fluids injector presents an unusual challenge to packaging of two metering systems into one. Electrical and mechanical efficiencies may be key to integration and implementation on an internal combustion (IC) engine. Reducing the package size may be one design objective when positioning of the metering and injection event is desired to be as close to combustion in the IC engine as possible.

The dual fluids delivery devices disclosed herein may be operable using a single electrical solenoid to control two metering events. Metering of two fluids may occur sequentially, but may also be mechanically programmed for synchronous actuation. Another example includes a plurality of solenoids wherein a separate solenoid is used to control each of the metering events individually.

Opening and closing timing for the two metering elements may be set with a fixed mechanical interface that is pre-programmed through spring loading, or mechanical linkage such as a lift ring and stop, of the metering element directly actuated by the electrical solenoid. The spring loading may be a feature assisting a mechanical linkage where pressure is maintained against mating elements in one direction of motion while the movement of the primary element reaches a programmed mechanical limit communicating with the secondary element thereby carrying the secondary element the remainder of the solenoid travel of the primary element. The second metering element may fully actuate after the spring pressure of the first element is released and the fluid pressure around the second element unseats the second metering element from its sealing surface.

In one arrangement, the dual fluids metering device delivers the fluids in separate channels. One channel may accommodate a liquid fluid component that is supplied into the device upstream of a mixing chamber. The mixing chamber may include features of a multi-physics atomizer such as those disclosed in U.S. Patent Publication No. 2011/0284652, which is incorporated herein in its entirety by this reference. The dual fluids metering device may include a solenoid coil that controls flow of the liquid fluid component. A gaseous component may be supplied into the device mixing chamber by communicating with a gaseous delivery channel in, for example, a manifold, rail, intake manifold or cylinder head of the device.

While the two fluids primarily referenced herein for use with a dual fluids metering device are liquid and gaseous, there may be other combinations of fluids handled by the device. For example, a gaseous-gaseous combination or liquid-liquid combination may also be used. The combinations may change with running modes whereas a fluid may be switched from one type of fluid to another depending on demands from the engine or other parameters such as, for example, altitude and temperature. Each application may determine the optimum fluid requirements.

In the application of a dual fluids spray nozzle, two fluids are released into a reaction chamber where they interact with each other and with physical features of the nozzle for mixing and breaking up the fluids into smaller particles. A fixed mechanical timing as presented herein may be particularly useful for mixing and delivering the fluids.

An example two-step metering solenoid actuation sequence is now described with reference to a two-step metering device that includes a single solenoid that directly acts upon only one of the first and second metering elements. The two-step metering device begins with the first and second metering elements in a closed position that prevents flow of the first and second fluids. Current is applied to the solenoid to lift a first metering element from its sealing surface, which permits a first fluid to flow into a mixing chamber. Moving the first metering element reduces tension in a biasing member that is applying a biasing force to the second metering element. As the tension is relieved on the second metering element, the second metering element is lifted from its sealing surface to release the second fluid into the mixing chamber. The mixed fluids are delivered out of the delivery device.

At the end of the metering event, electrical current to the solenoid is stopped. A second biasing member, which is compressed when the first metering element moves off of its sealing surface, applies a biasing force to return the first metering element towards its sealing surface. As the first metering element begins to move, tension in the first spring increases to apply a biasing force that moves the second metering element into contact with its sealing surface to stop flow of the second fluid. The first fluid continues to flow until after the second metering element is seated. The first metering element then contacts its sealing surface to stop flow of the first fluid.

In at least one example, the spring applying a biasing force on the second metering element may be augmented, for example, with a mechanical travel lift ring and stop that directly communicates with the first metering element. This coupling between the first and second metering elements may physically lift the second metering element off its seat in concert with actuation of the first metering element, thereby eliminating potential flow variances produced by dependence of the second metering element being lifted by fluid pressure and other forces alone, where deviations in pressure and flow may impact metering repeatability.

There are some engine applications that do not require exceptional precision in controlling the fuel and oxidant delivery in the fuel delivery device. Some applications may not justify the relatively complex and expensive controls needed for a more highly precise control of the fluids (e.g., gaseous oxidant and liquid fuel). In such situations, a single solenoid system or a dual solenoid, low complexity system may be used. In one example, a single controlled signal to a single solenoid begins opening the device. One or more mechanical feature may relieve pressure that allows the air flow to open first and then the fuel flow, followed by the air flow beginning to close, which cause the fuel flow to close followed by closing the air flow. The simple design of the fuel delivery device and associated less complex control system may result in a smaller package size and reduced costs. These advantages may make it possible to provide the fuel delivery device in engines that do not include an existing complex control system. Some example applications include small engines and gen-set engines such as generators, garden implements, garden tractors, lawnmowers, etc. In these types of applications, the emissions requirements are becoming more stringent. The fundamental advantages of the fuel delivery devices disclosed herein, which include the advantages of the multi-physics atomizer disclosed in U.S. Patent Publication No. 2011/0284652, may be realized while not requiring the size, complexity and cost of other types of systems.

Referring now to FIGS. 1-6E, an example fuel delivery device 10 is shown and described. Fuel delivery device 10 may also be referred to as a dual fluids metering device, dual fluids injector, coaxial fuel injector, or dual fluids delivery device.

The fuel delivery device 10 includes a housing assembly 12, a fuel plunger 14, a fuel spring 16, an air plunger 18, an air spring 20, a solenoid 22, a plunger carrier 24, and a fuel filter 26 (see FIGS. 5 and 6A-6E). The fuel delivery device 10 is operable using a single solenoid, actuation of which controls movement of both the fuel plunger 14 and air plunger 18. Other examples, such as the fuel delivery device 200 described below with reference to FIGS. 7-12E, include at least two solenoids, which are separately activated to control movement of the fuel plunger and the air plunger.

Referring again to FIG. 3, the housing assembly 12 includes a delivery tip 30, a lower mix housing 32, an upper mix housing 34, a fuel inner housing 36, an air housing 38, a solenoid housing 40, and a cover housing 42. The housing assembly 12 may also include first, second, third and fourth o-rings 44, 46, 48, 50, although many other arrangements for sealing members (e.g., numbers and placement) are possible. The housing assembly 12 defines at least in part at least one cavity that houses other features of the fuel delivery device 10 such as, for example, the fuel plunger 14, air plunger 18, solenoid 22 and associated operational features. The housing assembly 12 may be configured to have a reduced size to permit positioning of the fuel delivery device 10 as close to the combustion event in the engine as possible. The coaxial arrangement of the fuel plunger 14 and air plunger 18 within the housing assembly 12 may help reduce the size (e.g., maximum diameter and length) of the housing assembly 12.

The delivery tip 30 may include a mixing chamber 51. The upper mix housing 32 may include a fuel sealing seat 52, a fuel aperture 54, a fuel cavity 56, a plurality of air channels 58, an air sealing seat 60, and an air aperture 62. The fuel sealing seat 52 provides a surface against which the fuel plunger 14 contacts to control opening and closing of the fuel aperture 54. The fuel cavity 56 holds a volume of fuel that is maintained at a substantially constant fuel pressure. The volume of fuel is delivered through the fuel filter 26 and a central channel of the plunger carrier 24 and into the axial fuel channel 92 and lateral fuel channel 94.

The air sealing seat 60 provides a surface against which the air plunger 18 contacts to control opening and closing of access into the air aperture 62. The air aperture 62 is in fluid communication with the air channels 58, which deliver an oxidant (e.g., air) into the mixing chamber to mix with fuel delivered through the fuel aperture 54. The air channels 58 may be spaced apart circumferentially. The air channels 58 may be arranged in at least one of a tangential angle and a radially inward angle relative to a longitudinal axis of the device to provide a swirl effect within the mixing chamber 51 as air is delivered through the air channels 58 into the mixing chamber 51. The swirl effect generated in the mixing chamber 51 may facilitate mixing of the fluids and assist in clean out of the mixing chamber 51 at the end of the injection event.

Figure 6A:
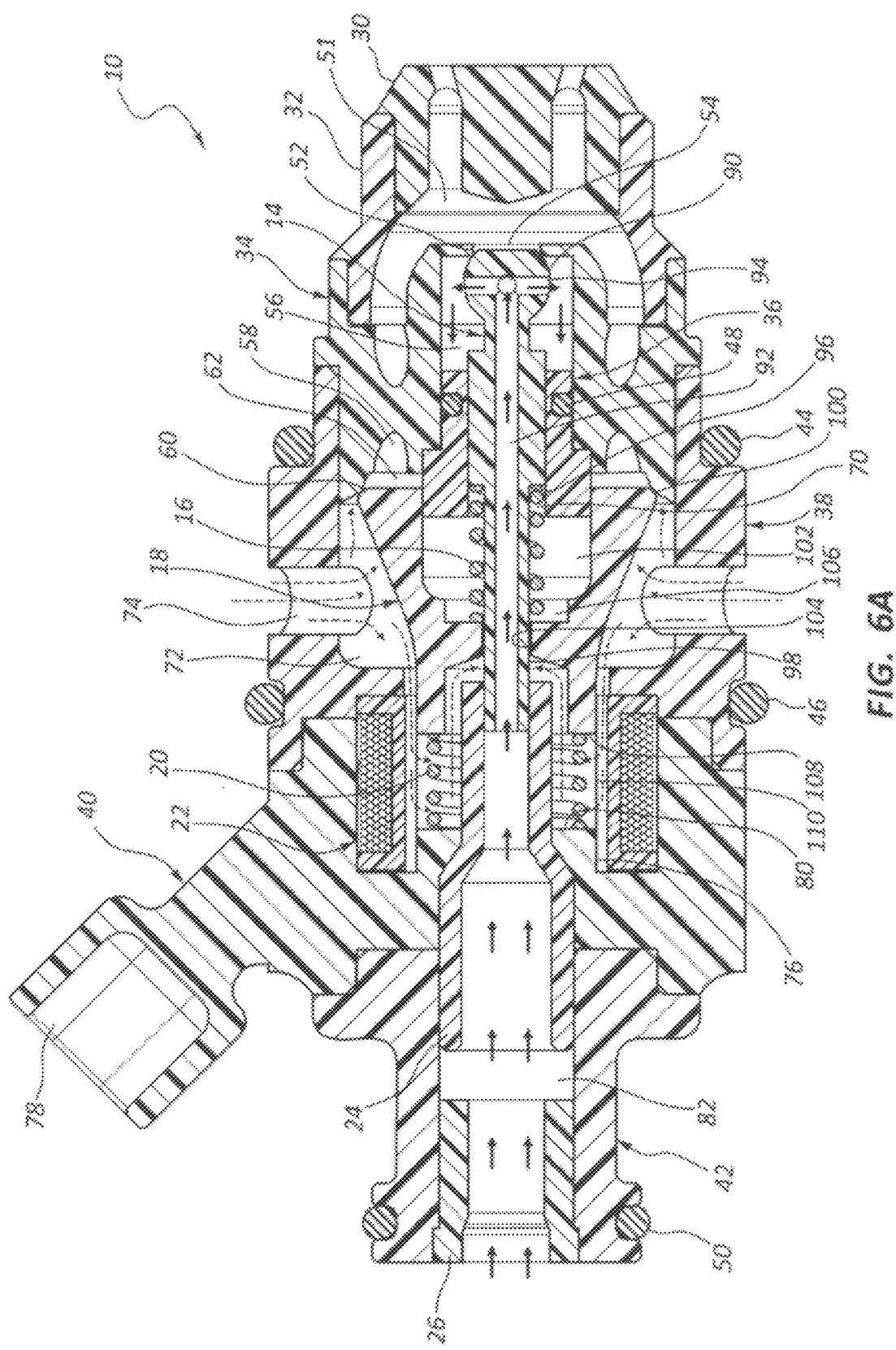
FIGS. 6A-6E are cross-sectional views of the fuel delivery device of FIG. 4 taken along cross-section indicators 6-6 showing different phases of operation.

The fuel inner housing 36 may include a plunger seat 70 sized to receive the fuel plunger 14. The fuel inner housing 36 may be seated within the upper mix housing 34. The fuel inner housing 36 may extend into a fuel housing seat 102 of the air plunger 18 as shown in FIG. 6A. A portion of the fuel spring 16 may also extend into the plunger seat 70.

The air housing 38 includes an air cavity 72 and a plurality of air inlets 74 in fluid communication with the air cavity 72. Air is typically maintained at a constant pressure within the air cavity 72.

The solenoid housing 40 includes a solenoid seat 76, a connector seat 78, and an air spring seat 80. The solenoid seat 76 is sized to receive the solenoid 22. The connector seat 78 is receptive of an electronic connector that provides electronic communication with the solenoid 22. The air spring seat 80 may be sized to house the air spring 20 as shown in FIG. 6A. A proximal end of the air spring 20 contacts a proximal surface of the air spring seat 80. A distal surface of the air spring 20 abuts against the proximal surface 108 of the air plunger 18.

The fuel spring 16 has a proximal surface that abuts against a proximal surface of the fuel spring seat 106 of air plunger 18. A distal surface of the fuel spring 16 abuts a proximal surface of the spring seat 96 of the fuel plunger 14. The fuel spring 16 may be mounted to the stem 98 of the fuel plunger 14.

The cover housing 42 includes a bore 82 receptive of the fuel filter 26 and a proximal portion of the plunger carrier 24. The plunger carrier 24 also extends distally through the solenoid housing 40 and into a proximal portion of the air plunger 18 where the stem 98 of the fuel plunger 14 is received within the plunger carrier 24.

The first and second o-rings 44, 46 provide a fluid tight seal on opposing sides of the air inlets 74 into the air housing 38. The third o-ring 48 provides a fluid tight seal with the fuel cavity 56. The fourth o-ring 50 provides a fluid tight seal around the fuel inlet into the fuel delivery device 10 via, for example, the fuel filter 26.

FIGS. 6A-6E illustrate operation of the fluid delivery device 10 for a fuel delivery sequence, which is typically associated with a combustion cycle of an IC engine. FIG. 6A shows the fuel delivery device 10 in a closed state with the fuel plunger 14 in a closed position and the air plunger 18 in a closed position. In the arrangement of FIG. 6A, fuel and air are restricted from moving into the mixing chamber 51. A volume of fuel maintained in the fuel cavity 56 is prevented from moving into the mixing chamber 51 by the sealed interface between the distal sealing surface 90 of the fuel plunger 14 and the fuel sealing seat 52 of the upper mix housing 34. A volume of air held in the air cavity 72 is prevented from moving into the mixing chamber 51 by a sealed interface between the distal sealing surface 100 of the air plunger 18 and the air sealing seat 60 of the upper mix housing 34. The fuel spring 16 applies a biasing force to the fuel plunger 14 that maintains the fuel plunger 14 in the advanced, sealed position shown in FIG. 6A. The air spring 20 applies a biasing force to the air plunger 18 that maintains the air plunger 18 in the advanced, sealed position shown in FIG. 6A.

A fuel delivery sequence is initiated by activating the solenoid 22. Activating the solenoid 22 creates a magnetic field within the bore 110. The magnetic field acts upon the air plunger 18 to move the air plunger 18 axially in a rearward direction into the magnetic field.

Figure 6B:
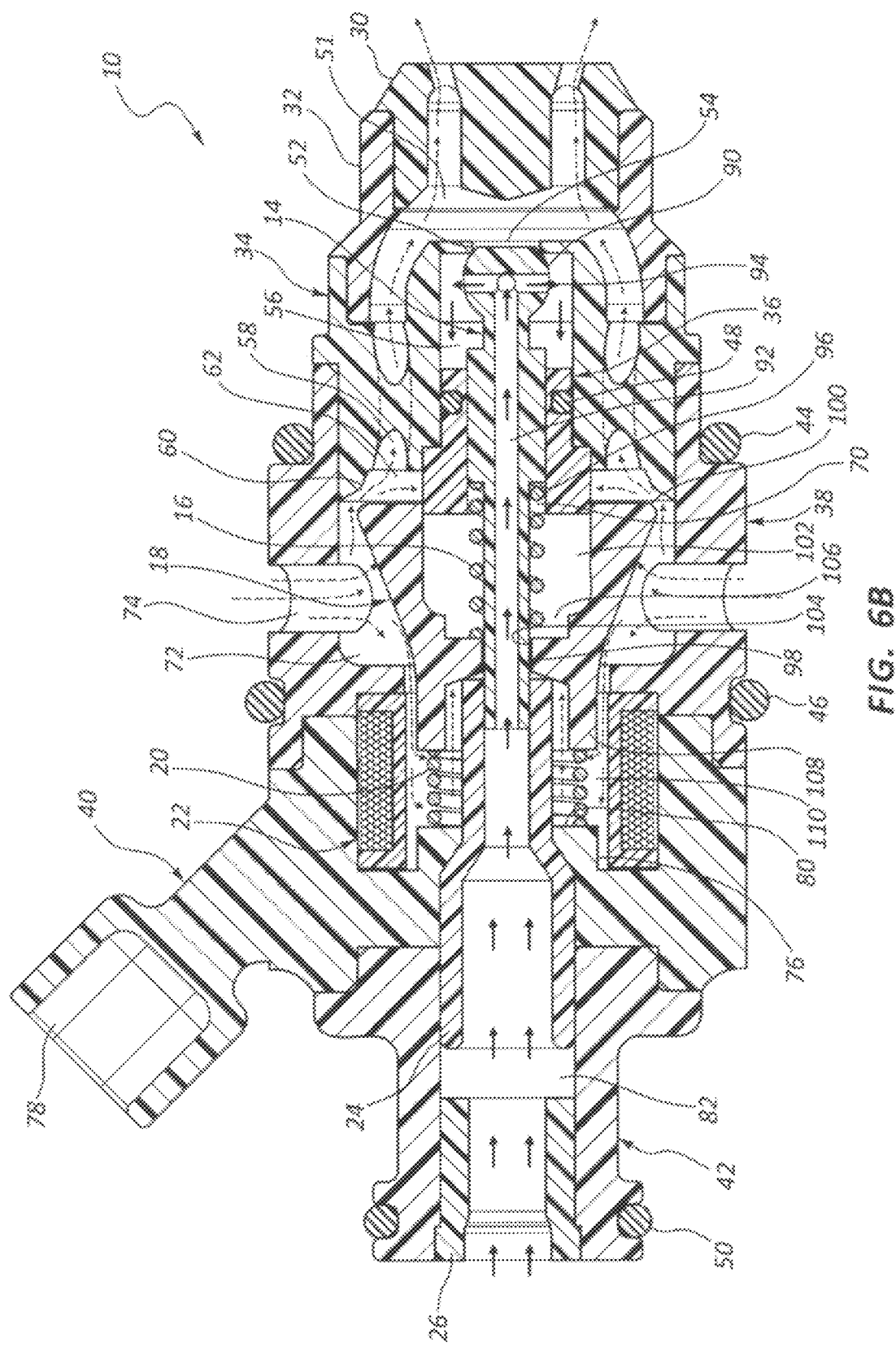

The air plunger 18 is moved rearward against biasing forces of the air spring 20. The air plunger 18 moves a distance determined at least in part by at least one of a spring constant of air spring 20, a minimum length of the air spring 20 when completely compressed, and the strength of the magnetic field generated by solenoid 22. Alternatively, as discussed in other examples, a mechanically programmed distance may be applied with a physical feature that controls travel distance, which affect both distance and spring rate. The distance and spring rate may both impact response time of the travelling member. In at least one example, the air plunger 18 moves a rearward distance sufficient to completely compress the air spring 20, wherein the length of the air spring 20 in its completely compressed state determines a maximum travel distance for the air plunger 18. FIG. 6B shows the air plunger 18 moved rearward to at least partially compress the air spring 20. Rearward movement of the air plunger 18 moves the distal sealing surface 100 away from the air sealing seat 60 to open the air aperture 62. Air held within the air cavity 72 travels through the air aperture 62, into the air channels 58 and into the mixing chamber 51. As discussed above, the air channels 58 may be arranged to create a swirl effect of air within the mixing chamber 51, which swirl effect may promote mixing of the fluids and clean out of the mixing chamber 51. The air in mixing chamber 51 flows out of the delivery device through the delivery tip 30.

Figure 6C:
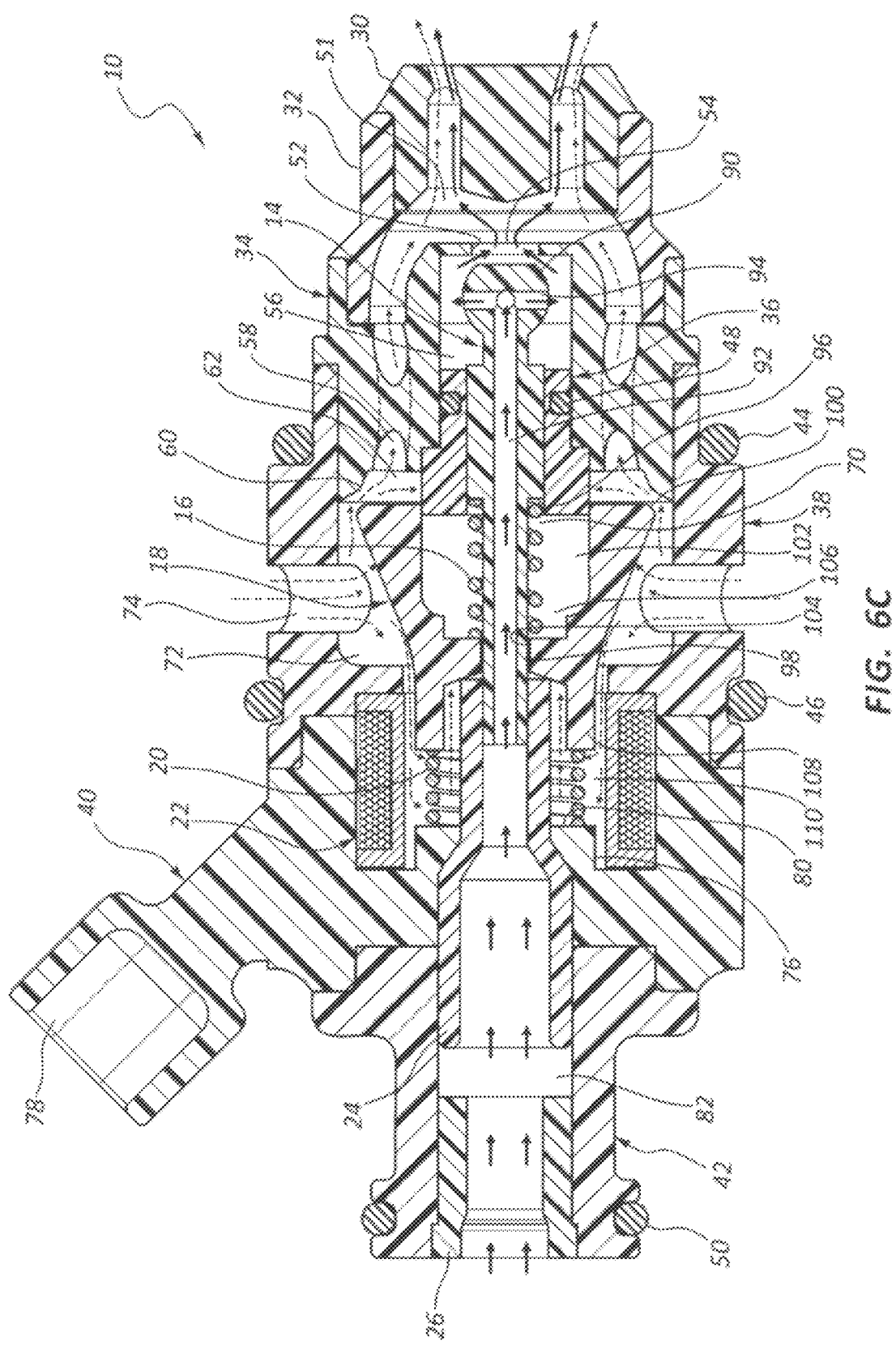

Moving the air plunger 18 rearward also reduces tension in the fuel spring 16 as shown in FIG. 6B. Reducing the tension in fuel spring 16 relieves the biasing force being applied to fuel plunger 14 that holds the distal sealing surface 90 of the fuel plunger 14 in contact with the fuel sealing seat 52. After a certain distance travelled by the air plunger 18 in a rearward direction, the tension in fuel spring 16 reduces sufficiently to permit the fuel plunger 14 to also move rearward as shown in FIG. 6C. The rearward movement of fuel plunger 14 removes the distal sealing surface 90 from contact with the fuel sealing seat 52 to open the fuel aperture 54. Fuel is then able to flow through the fuel aperture 54 into the mixing chamber 51 where the fuel mixes with the air, as discussed above. A mixture of the air and fuel is delivered through the delivery tip 30 to a combustion chamber (not shown) where the fuel and air mixture is combusted in the IC engine.

Figure 6D:
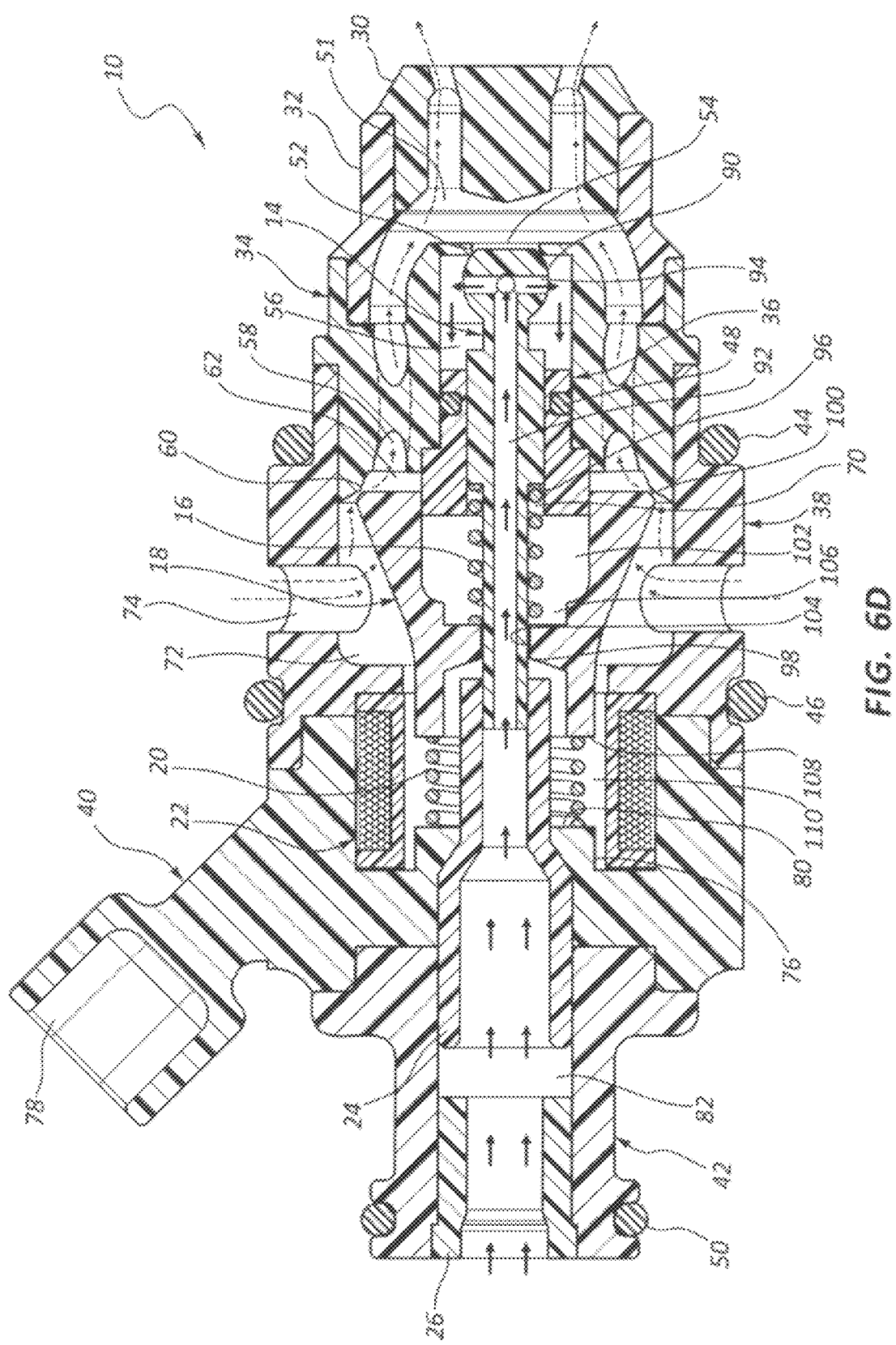
Figure 6E:
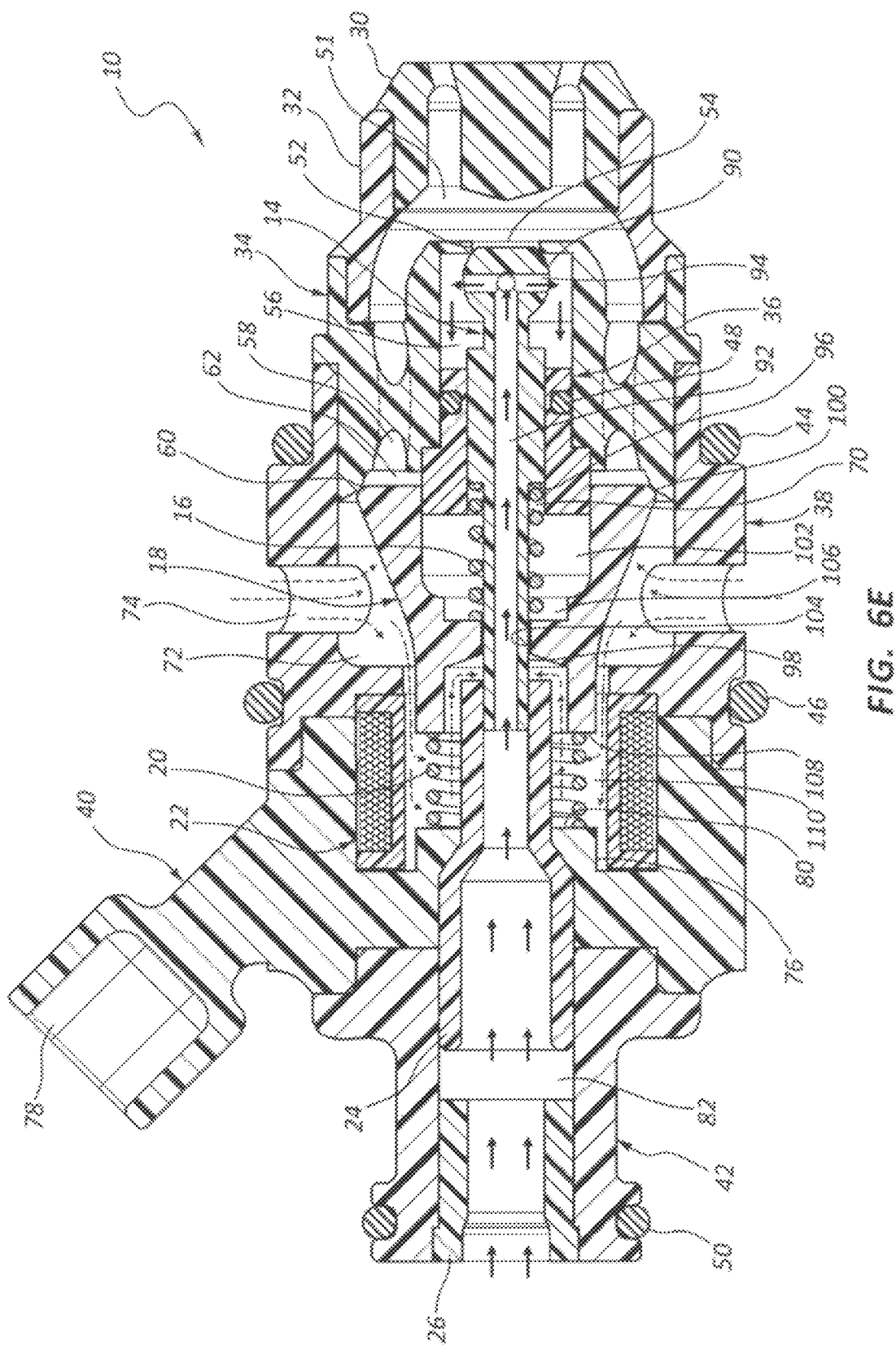
Figure 9:
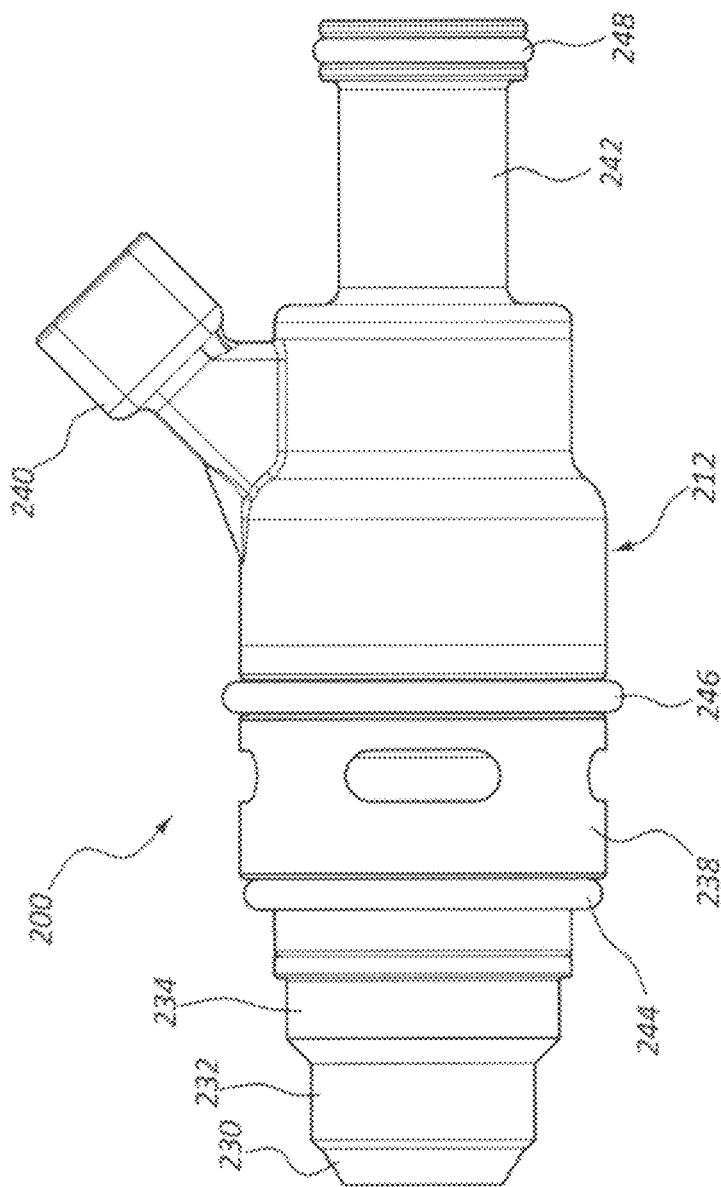
FIG. 9 is a side view of the fuel delivery device of FIG. 7.
Figure 10:
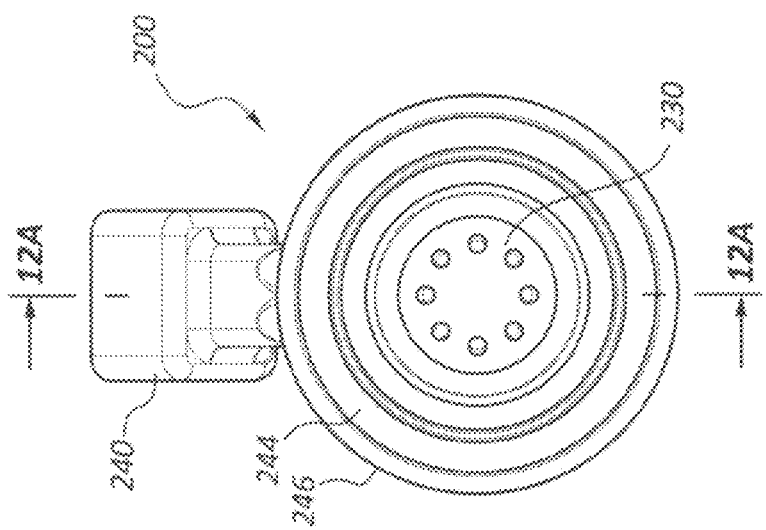
FIG. 10 is a front view of the fuel delivery device of FIG. 7.

Referring now to FIG. 6D, the fueling sequence continues by deactivating the solenoid 22. Deactivating the solenoid 22 may include removing the electrical charge to the solenoid 22, which eliminates the magnetic field. With the magnetic field removed, the air plunger 18 begins to move forward against biasing forces applied by the air spring 20. As the air plunger 18 begins to move forward, tension builds in the fuel spring 16, which applies a biasing force that moves the fuel plunger 14 in a forward direction to contact the distal sealing surface 90 against the fuel sealing seat 52 to close the fuel aperture 54. The air spring 20 continues to act on the air plunger 18 to move the air plunger 18 forward until the distal sealing surface 100 contacts the air sealing seat 60 to close the air aperture 62. FIG. 6E shows the fuel plunger 14 and air plunger 18 in closed positions, which completes the fuel delivery sequence.

The delay between closing the fuel aperture 54 and closing the air aperture 62 provides a flow of air through the mixing chamber 51 that substantially clears out any fuel from the delivery tip 30 prior to the air being shut off. Clearing out the delivery tip 30 and associated mixing chamber 51 may assist in providing a more constant fuel particle size emitted from the fuel delivery device 10 and help eliminate the build up of fuel within the delivery tip 30 that may affect consistent performance of the fuel delivery device 10 through multiple fuel delivery sequences.

FIGS. 7-12E show another example fuel delivery device 200. The fuel delivery device 200 includes separate solenoids to provide independent control of the fuel and air delivered to the mixing chamber of the fuel delivery device. Referring to FIGS. 7-11, the fuel delivery device 200 includes a housing assembly 212 (see FIGS. 7-8), a fuel plunger 214, a fuel spring 216, an air plunger 218, an air spring 220, a first solenoid 222, a fuel filter 226, and a second solenoid 228 (see FIG. 11). The first solenoid 222 operates with the air spring 220 to move the air plunger 218 between open and closed positions. The second solenoid 228 operates with the fuel spring 216 to move the fuel plunger 214 between open and closed positions. The first solenoid 222 includes a bore 310 within which at least the plunger 218 extends. The second solenoid 228 includes a bore 312 within which at least the fuel plunger 214 extends. The fuel filter 226 includes a distal surface 314 against which a proximal surface of the air spring 220 contacts as will be described in further detail below.

Figure 11:
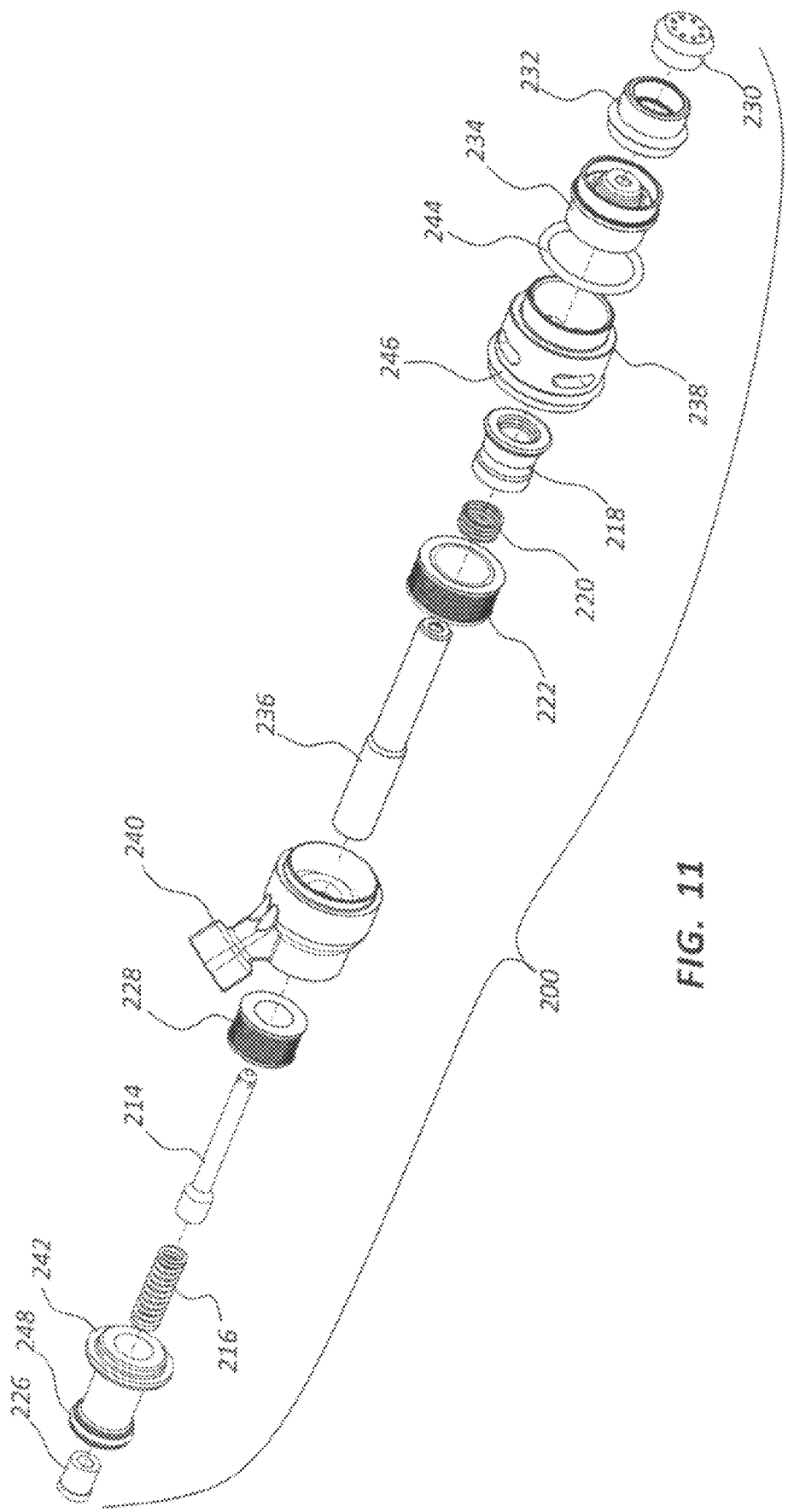
FIG. 11 is an exploded perspective view of the fuel delivery device of FIG. 7.

The housing assembly 212 is described with reference to FIGS. 11 and 12A. The housing assembly 212 includes a delivery tip 230, a lower mix housing 232, an upper mix housing 234, a fuel inner housing 236, an air housing 238, a solenoid housing 240, and a cover housing 242. The housing assembly 212 also includes first, second and third o-rings 244, 246, 248.

The delivery tip 230 includes a mixing chamber 251. The upper mix housing 234 includes a fuel aperture 254, a plurality of air channels 258, an air sealing seat 260, and an air aperture 262. The fuel inner housing 236 includes a plunger seat 270 and a fuel aperture 271. The air housing 238 includes an air cavity 272 and a plurality of air inlets 274. The solenoid housing 240 includes a first solenoid seat 276, a connector seat 278, an air spring seat 280, and a second solenoid seat 281. The cover housing 242 includes a bore 282 sized to receive the fuel filter 226.

The fuel plunger 214 includes a distal sealing surface 290, an axial fuel channel 292, a lateral fuel channel 294 and a spring seat 296. The air plunger 218 includes a distal sealing surface 300, a plunger bore 304, and a proximal surface 308.

The distal sealing surface 290 of the fuel plunger 214 is arranged to contact the plunger seat 270 of the fuel inner housing 236 and to control fluid flow from a fuel cavity 256 within the fuel inner housing 236 into the mixing chamber 251. The distal sealing surface 300 of the air plunger 218 is arranged to contact the air sealing seat 260 of the upper mix housing 234 to control airflow from the air cavity 272 into the mixing chamber 251 similar to the arrangement of FIGS. 1-6E. The fuel inner housing 236 and fuel plunger 214 move axially in a direction independent of axial movement of the air plunger 218. This independent movement may make it possible to move the fuel plunger 214 and air plunger 218 in any desired sequence to control the flow of air and fuel into the mixing chamber 251. Further, the independent control provided by the embodiment of FIGS. 7-12E may make it easier to control the delays between opening and closing the fuel plunger 214 and air plunger 18 as compared to the fuel delivery device 10. The air plunger 18 of fuel delivery device 10 may require exchange of the fuel and air springs or changing the fuel and air pressures in order to change the delay between the opening and closing of each of the fuel and air plungers.

Figure 12A:
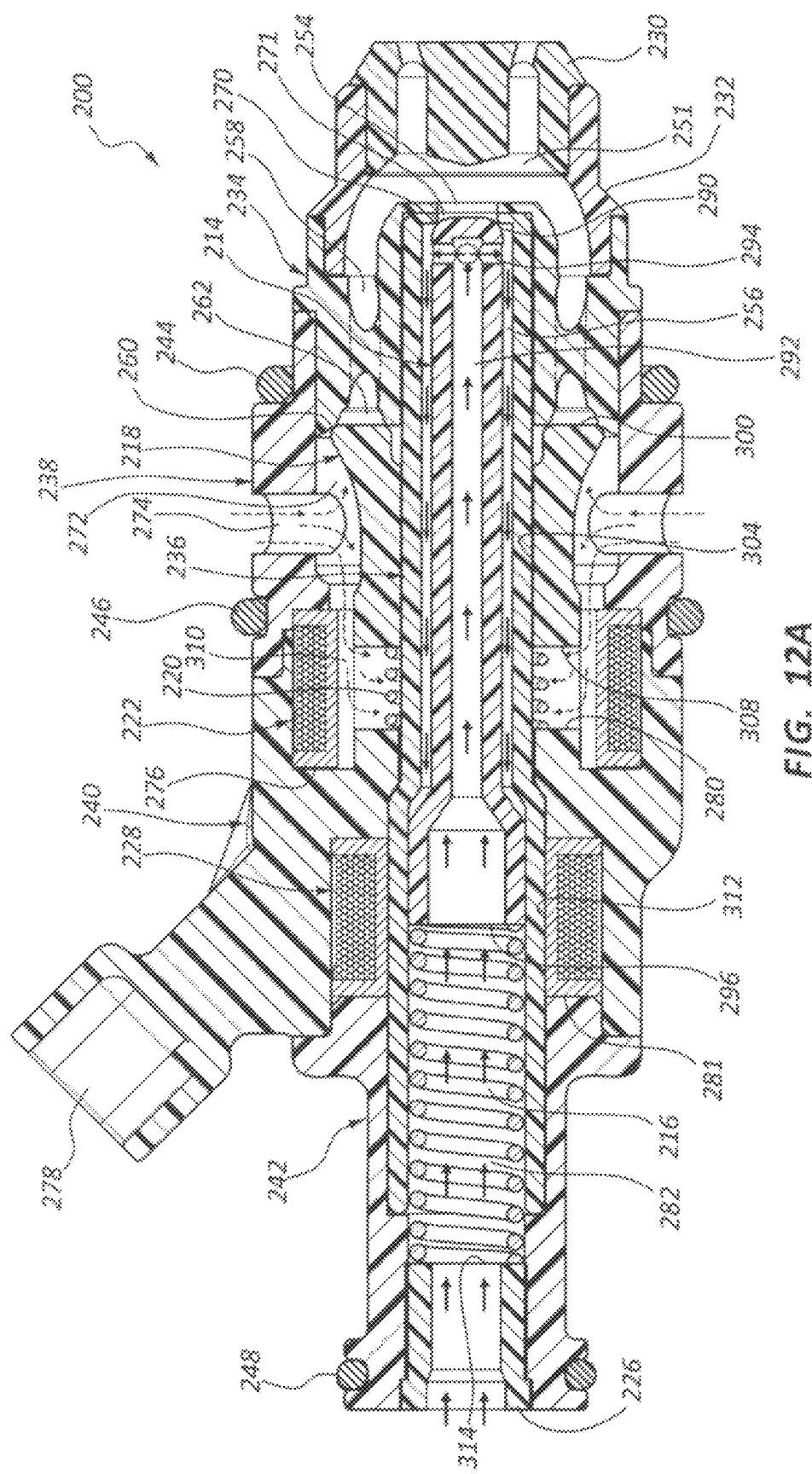
FIGS. 12A-12E are cross-sectional views of the fuel delivery device of FIG. 10 taken along cross-section indicators 12-12 showing different phases of operation.
Figure 12B:
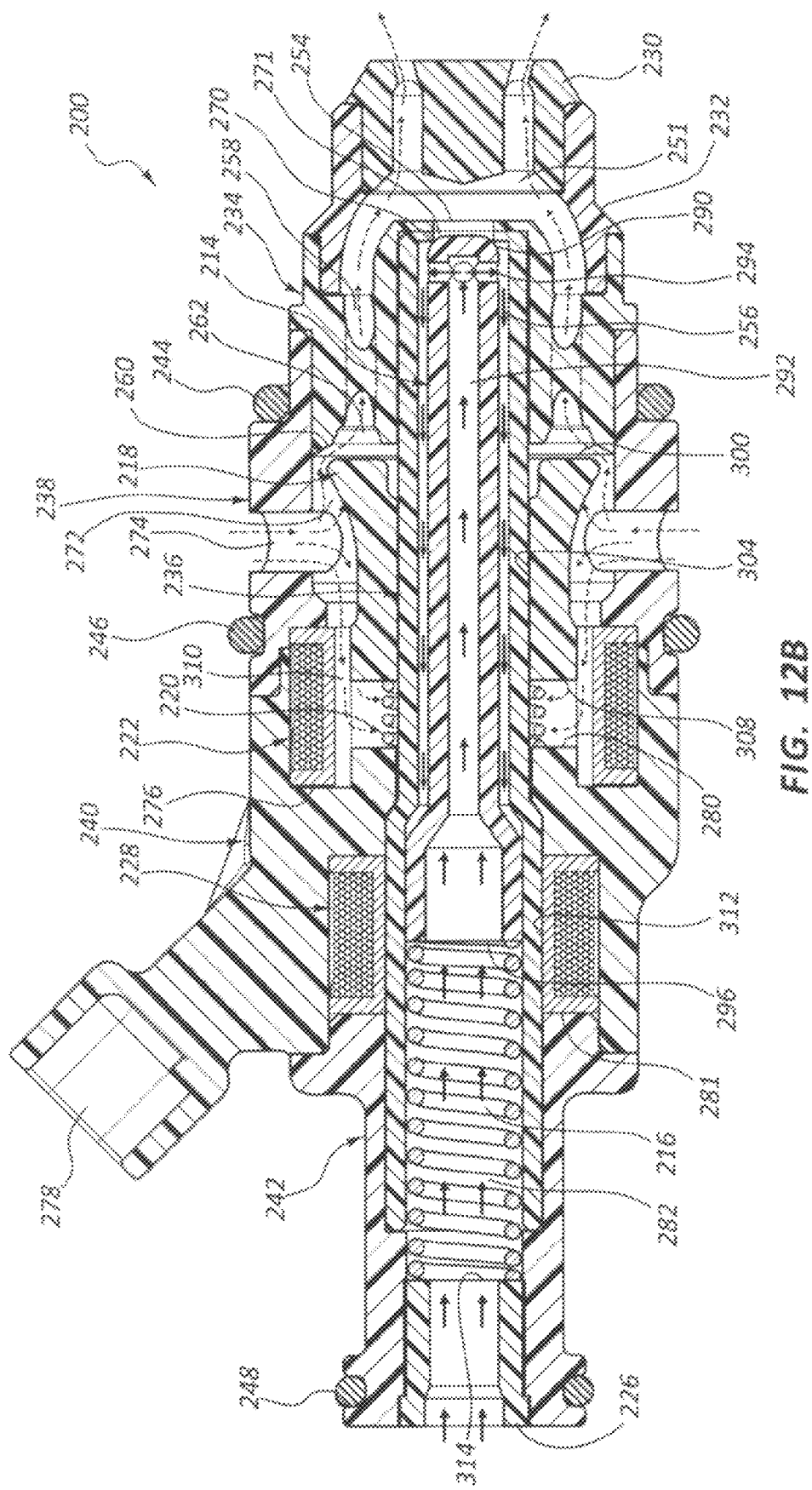

Referring now to FIGS. 12A-12E, an example fuel delivery sequence or fueling event is described. FIG. 12A shows the fuel plunger 214 and air plunger 218 in closed positions. The fuel spring 216 applies a biasing force to the fuel plunger 214 that holds the distal sealing surface 290 against the plunger seat 270 to prevent fluid flow into the mixing chamber 251. The air spring 220 applies a biasing force to the air plunger 218 that holds the distal sealing surface 300 against the air sealing seat 260 to prevent airflow into the mixing chamber 251.

The fueling sequence is initiated by activating the first solenoid 222, which generates a magnetic field that draws the air plunger 218 rearward against biasing forces of the air spring 220 to move the distal sealing surface 300 away from the air sealing seat 260. Air from the air cavity 272 travels through the air channels 258, into the mixing chamber 251 and out of the delivery tip 230. The air spring 220 is at least partially compressed when the air plunger 218 is retracted into the position shown in FIG. 12B.

Figure 12C:
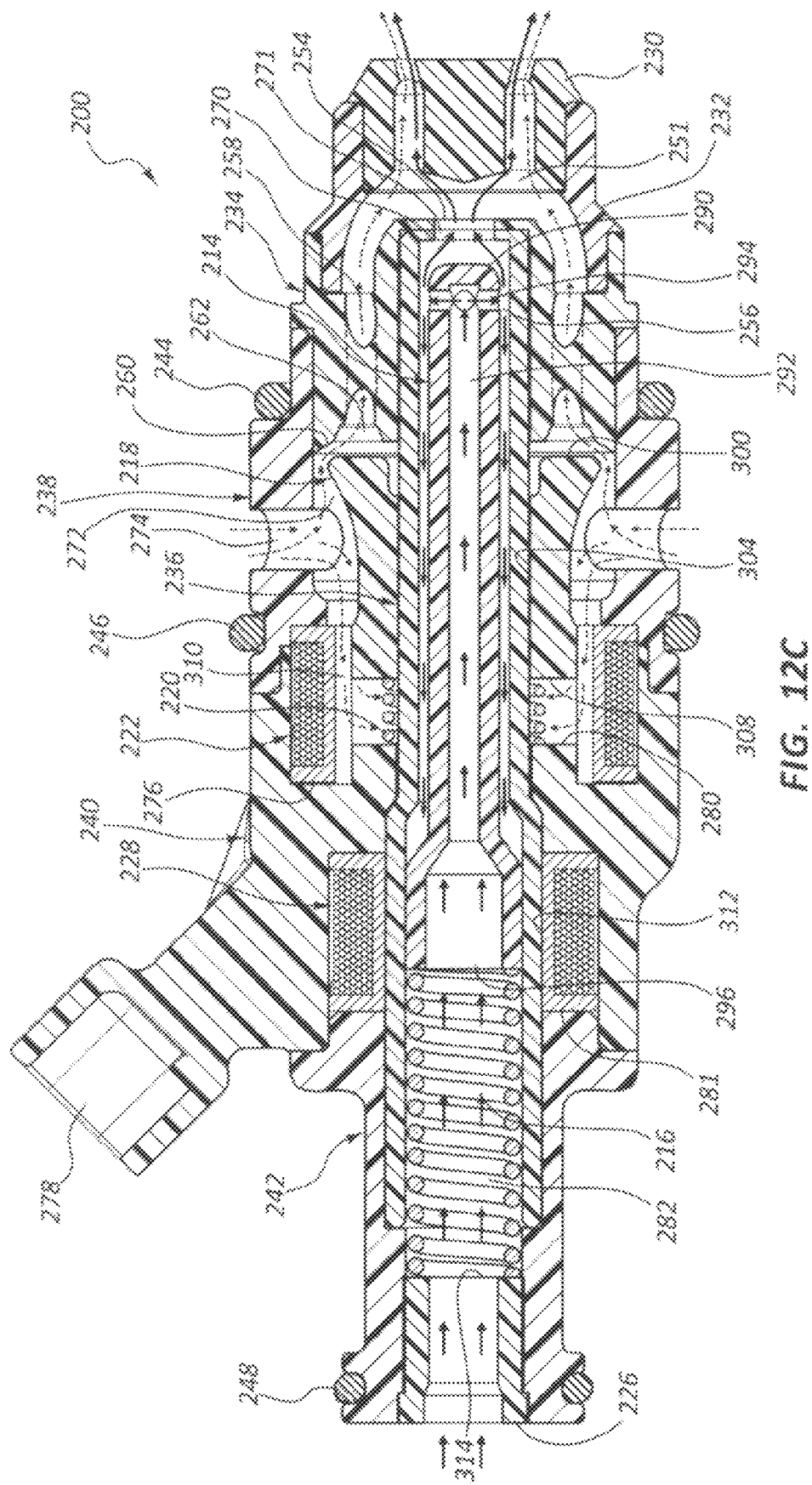

A further step in the fueling sequence may include activating the second solenoid 228, which creates a magnetic field that draws the fuel plunger 214 axially in a rearward direction against biasing forces of the fuel spring 216. Withdrawing the fuel plunger 214 as shown in FIG. 12C moves the distal sealing surface 290 away from the plunger seat 270 to permit fuel to flow from the fuel cavity 256, through the fuel aperture 271 and fuel aperture 254, and into the mixing chamber 251 to mix with the airflow. The fuel and air mix within the mixing chamber 251 and are delivered out of the delivery tip 230 for combustion within a combustion chamber of the IC engine.

Figure 12D:
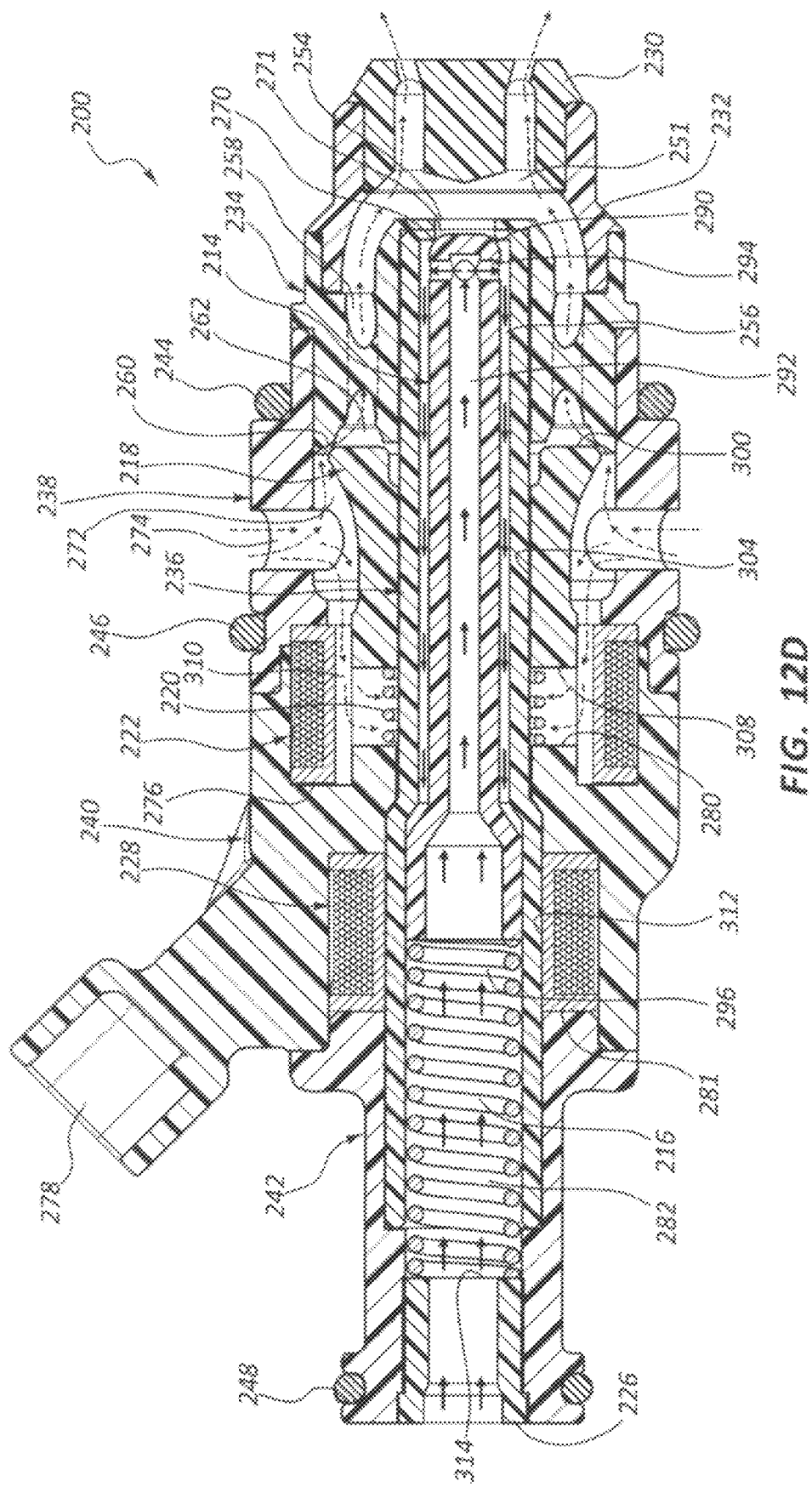

The second solenoid 228 is then deactivated to eliminate the magnetic field acting upon the fuel plunger 214. With the magnetic field removed, the fuel spring 216 applies its biasing force to the fuel plunger 214 to begin advancing the distal sealing surface 290 toward contact with the plunger seat 270 to stop fuel flow into the mixing chamber 241, as shown in FIG. 12D.

Figure 12E:
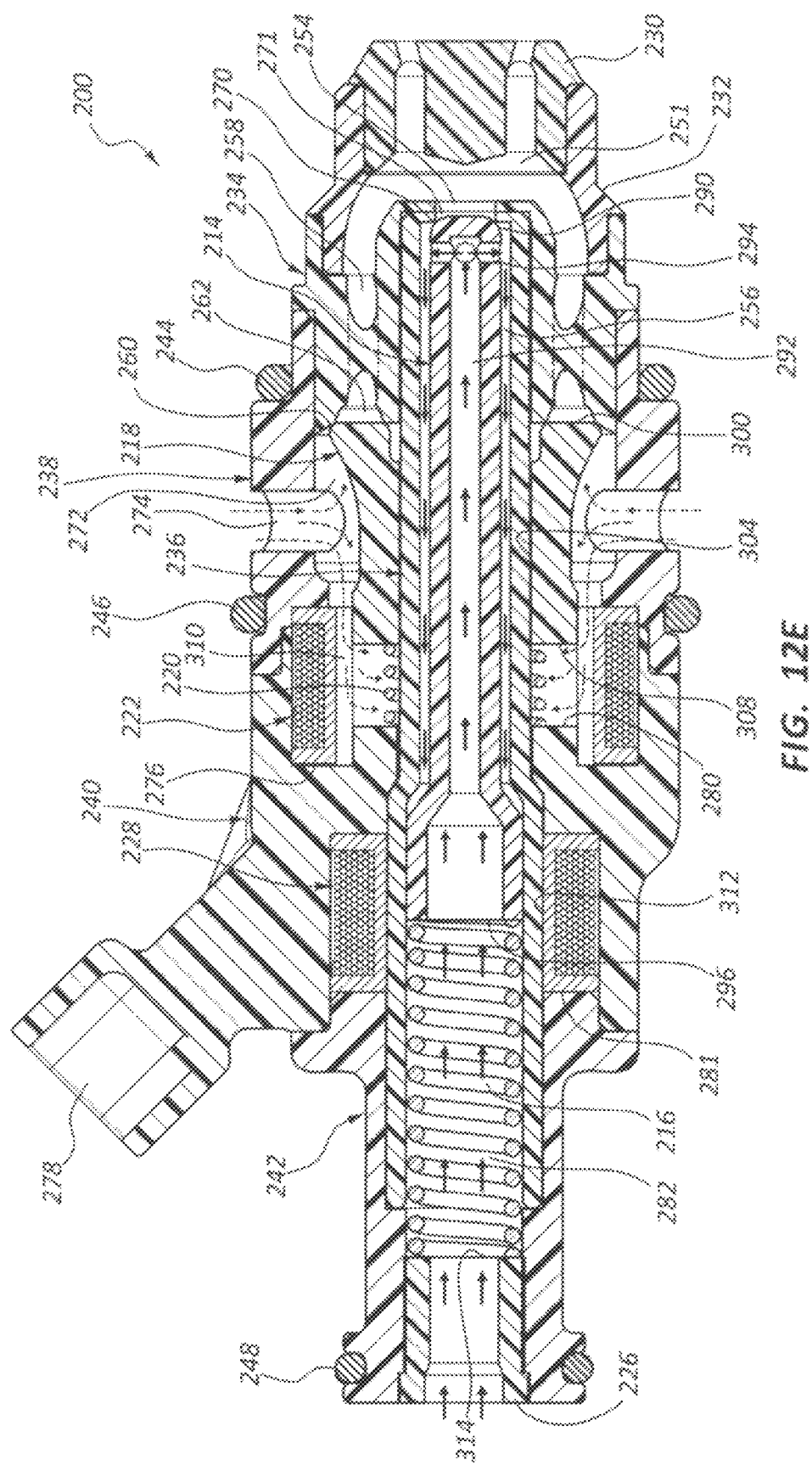

The airflow is stopped by deactivating the first solenoid 222, which eliminates the magnetic field acting on air plunger 218 and permits the air spring 220 to advance the distal sealing surface 300 of the air plunger 218 into contact with the air sealing seat 260 as shown in FIG. 12E. As discussed above, the delay between closing the fuel plunger 214 and closing the air plunger 218 permits the air flow to clear out fuel within the mixing chamber 251 and delivery tip 230.

Many other sequences are possible for opening and closing the fuel plunger 214 and air plunger 218 because of the independent control provided by the first and second solenoids 222, 228. In one example, the fuel plunger 214 and air plunger 218 are opened concurrently followed by closing the fuel plunger prior to closing the air plunger. In another example, the air plunger 218 is opened before the fuel plunger 214 followed by closing the fuel plunger 214 and air plunger 218 concurrently. In a still further example, both of the fuel plunger 214 and air plunger 218 are opened concurrently and closed concurrently.

The delays between opening and closing the fuel plunger and air plunger in the examples disclosed herein may be relatively short. In one example, a delay between opening the air plunger and opening the fuel plunger may be less than 10 milliseconds (ms), and preferably in the range of about 0 ms to about 1 ms. The delay between closing the fuel plunger and closing the air plunger may be less than about 10 ms, and more preferably in the range of about 0 ms to about 2 ms.

The time period in which the fuel plunger and air plunger are maintained open may vary depending on the variety of parameters, including, for example, the type of fuel and/or oxidant being used, the type of engine, and the size and shape of various features of the fuel delivery device. In one example, the time period in which both of the fuel plunger and air plunger are open at the same time is less than 20 ms, and more preferably in the range of about 1 ms to about 5 ms.

As briefly mentioned above, it is possible to use a mechanical travel lift ring and stop to more tightly control timing between movement of the fuel plunger after the air plunger has opened. A lift ring and stop may reduce reliance upon one or both of the springs operable between the fuel plunger and air plunger during at least one direction of travel. In the case of using a lift ring and stop, the air plunger moves a certain distance and then lifts the fuel plunger by contact of the lift ring with a stop feature associated with the fuel plunger. This arrangement eliminates the need to wait for spring pressure to be relieved before the fuel plunger moves. The fuel spring may still be present, but typically plays a secondary role in helping to move the plunger in a reverse direction. The fuel spring may be more active in moving the fuel plunger in a forward direction to close the fuel plunger.

The solenoids used in the fuel delivery devices discussed herein generate magnetic fields that act upon the ferrous material that is closest to the magnetic field. Typically, in the fuel delivery device 200, which includes multiple solenoids, the solenoids are placed apart axially and independently act upon the fuel and air plungers or related features that move the fuel and air plungers. The solenoids may also be arranged at different radial positions relative to a central axis of the fuel delivery device. In the case of a single solenoid device, such as the fuel delivery device 10, a solenoid acts upon the closest ferrous element, which in the case of fuel delivery device 10 is the air plunger 18. The air plunger 18 is positioned radially closer to the solenoid than the fuel plunger 14 so that the air plunger 18 is acted upon by the solenoid rather than the fuel plunger 14. Further, the fuel plunger may comprise a different material than the air plunger, such as a material that is not responsive to the magnetic field generated by the solenoid. Other options are possible for protecting the fuel plunger or other features of the fuel delivery device from being acted upon by the magnetic field generated by the solenoid.

One advantage related to the fuel delivery devices disclosed herein is the possibility of providing an integrated body for air and fuel delivery/mixing with a reduced fuel system complexity. Another advantage is a potential for reduced physical package size for integration into an engine. Reduced controls complexity is also available when using a single solenoid to control both air flow and fuel flow. Another potential advantage relates to the use of two closely coupled solenoids in a single integrated package, wherein one solenoid is used for fuel control and another solenoid is used for air control. An electromagnetic interference or reaction is possible between the two solenoids. A single magnetic solenoid may reduce the EMI potential of two high frequency and/or high current control signals in magnetic events, which may be avoided when using only a single solenoid.

Another advantage relates to a single magnetic solenoid application wherein potential performance limiting feedback is eliminated between two stacked or concentric (e.g., coaxial) solenoid coils. A further advantage relates to a dual fluids delivery via a common manifold, rake, intake manifold or cylinder head that provides an opportunity for preheating, which may provide cold start or cold environment operation. A still further advantage relates to facilitating two single fluid injection events in one device with one injection control pulse (e.g., via a single solenoid). This may provide a unique application in small, off-road, or consumer engine applications where controls overhead must be contained or otherwise limited.

As used throughout the specification and claims, the words "including" and "having," as used in the specification, including the claims, have the same meaning as the word "comprising."

The preceding description has been presented only to illustrate and describe certain aspects, embodiments, and examples of the principles claimed below. It is not intended to be exhaustive or to limit the described principles to any precise form disclosed. Many modifications and variations are possible in light of the above disclosure. Such modifications are contemplated by the inventor and within the scope of the claims. The scope of the principles described is defined by the following claims.

What is claimed is:

1. A dual fluid delivery device, comprising:
a housing having distal and proximal ends;
a first metering device having distal and proximal ends and being axially movable between open and closed positions to control flow of a first fluid through a first valve opening;
a second metering device arranged coaxially with and extending through the first metering device from the distal end to the proximal end of the first metering device, the second metering device being axially movable between open and closed positions to control flow of a second fluid through a second valve opening, the second valve opening positioned distal of the first valve opening in a direction toward the distal end of the housing.

2. The dual fluid delivery device of claim 1, wherein the first and second metering devices are independently operable between open and closed positions.

3. The dual fluid delivery device of claim 1, wherein operating the first metering device between open and closed positions causes the second metering device to automatically move between open and closed positions.

4. The dual fluid delivery device of claim 1, further comprising at least one solenoid configured to directly or indirectly move the first and second metering devices between closed and open positions.

5. The dual fluid delivery device of claim 1, further comprising at least one spring arranged between the first and second metering devices, and moving the first metering device changes a biasing force applied by the at least one spring to the second metering device.

6. The dual fluid delivery device of claim 1, wherein the first fluid comprises an oxidant and the second fluid comprises a fuel.

7. The dual fluid delivery device of claim 1, further comprising a mixing chamber positioned distal of the first and second metering devices and arranged to receive the first and second fluids upon opening of the first and second metering devices.

8. The dual fluid delivery device of claim 7, further comprising a first fluid inlet, a first valve seat, and a plurality of first fluid channels extending from the first valve seat to the mixing chamber, the first metering device being interposed between the first fluid inlet and the first valve seat.

9. The dual fluid delivery device of claim 1, wherein at least a portion of the second metering device extends distally beyond a distal end of the first metering device, and at least a portion of the second metering device extends proximally beyond a proximal end of the first metering device.

10. The dual fluid delivery device of claim 1, further comprising a pair of first fluid inlets positioned on opposite sides of the housing from each other and arranged in flow communication with the first metering device.

11. A dual fluid delivery device, comprising:
a housing having distal and proximal ends;
a first metering device having distal and proximal ends and being axially movable by a solenoid between open and closed positions to control flow of a first fluid through a first valve opening;
a second metering device arranged coaxially with and extending through the first metering device to deliver a second fluid from a location distal of the distal end of the first metering device, through the first metering device, and to a location proximal of the proximal end of the first metering device, the second metering device being axially movable between open and closed positions to control flow of a second fluid through a second valve opening, the second valve opening positioned distal of the first valve opening in a direction toward the distal end of the housing.

12. The dual fluid deliver device of claim 11, wherein operating the solenoid moves the first metering device between open and closed positions, which causes the second metering device to automatically move between open and closed positions.

13. The dual fluid deliver device of claim 11, further comprising another solenoid operable to move the second metering device between open and closed positions.

14. The dual fluid delivery device of claim 11, further comprising at least one spring arranged between the first and second metering devices, and moving the first metering device changes a biasing force applied by the at least one spring to the second metering device.

15. The dual fluid delivery device of claim 11, wherein at least a portion of the second metering device extends distally beyond a distal end of the first metering device, and at least a portion of the second metering device extends proximally beyond a proximal end of the first metering device.

16. The dual fluid delivery device of claim 11, further comprising a mixing chamber positioned distal of the first and second metering devices and arranged to receive the first and second fluids.

17. A method of controlling fluid flow, comprising:
providing a housing and first and second metering members, the housing having distal and proximal ends and an outlet at the distal end, the second metering member being arranged coaxially with and extending through the first metering member from a proximal end to a distal end of the first metering member in a direction toward the distal end of the housing;
moving the first metering member between a closed position and an open position to permit a first fluid to flow from a first valve seat into the mixing chamber;
moving the second metering member from a closed position to an open position to permit a second fluid to flow from a second valve seat into the mixing chamber, an entirety of the second valve seat spaced distal of the first valve seat in a direction toward the distal end of the housing;
moving the second metering member from the open position to the closed position to stop flow of the second fluid into the mixing chamber;
moving the first metering member to the closed position to stop flow of the first fluid into the mixing chamber after the second metering member moves to the closed position.

18. The method of claim 17, further comprising providing a first spring interposed between the first and second metering members, and a second spring interposed between the first metering member and a surface of the housing, wherein the first and second springs are arranged coaxially, the first spring applies an axial directed biasing to the first metering device, and the second spring applies an axial directed biasing force to the second metering device.

19. The method of claim 18, further comprising providing a solenoid, and activating the solenoid moves the first metering member against biasing forces of the second spring, and deactivating the solenoid permits the biasing forces of the second spring to move the first metering member into the closed position.

20. The method of claim 17, wherein
moving the first metering member towards the closed position automatically causes the second metering member to move to the closed position.

21. The dual fluid delivery device of claim 1, wherein the distal ends of the first and second metering devices are positioned within the housing at a location spaced rearward of a distal most end surface of the housing.

22. The dual fluid delivery device of claim 1, wherein the second metering device extends distally beyond a distal most end surface of the first metering device.

* * * * *